United States Patent Office 3,053,837
Patented Sept. 11, 1962

3,053,837
16,17-ACETAL AND KETAL DERIVATIVES OF 6α, 12α-DIHALO-16α,17α-DIHYDROXY STEROIDS OF THE PREGNANE SERIES; AND INTERMEDIATES THEREFOR
Josef Fried, Princeton, N.J., assignor to Olin Mathieson Chemical Corporation, New York, N.Y., a corporation of Virginia
No Drawing. Filed Oct. 1, 1958, Ser. No. 764,495
17 Claims. (Cl. 260—239.55)

This invention relates to, and has for its object the provisions of, a method of preparing physiologically active steroids, and to the physiologically active steroids produced thereby.

The steroids of this invention include the 16α,17α-acetal and ketal derivatives of 16α,17α-dihydroxy steroids and ketones or aldehydes, and more particularly steroids of the general formula

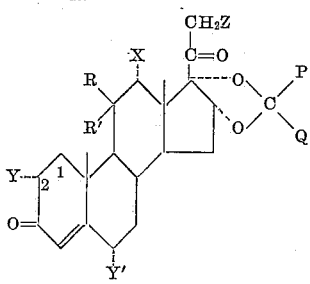

wherein the 1,2-position is saturated or double-bonded; R is hydrogen, R' is β-hydroxy or together R and R' is keto; X is halogen (i.e. fluoro, chloro, bromo or iodo); Y is hydrogen or methyl; Y' is halogen (preferably chloro or fluoro); Z is hydrogen, hydroxy or acyloxy (particularly the acyloxy radical of a hydrocarbon carboxylic acid of less than ten carbon atoms); and P and Q are hydrogen, lower alkyl, halogenated lower alkyl, monocyclic cycloalkyl, monocyclic aryl, monocyclic aryl lower alkyl, monocyclic heterocyclic, or monocyclic heterocyclic alkyl; or together with the carbon atom to which they are joined P and Q is cycloalkyl or monocyclic heterocyclic.

The compounds of this invention are prepared, in accordance with one process of this invention, by interacting a steroid reactant of the general formula

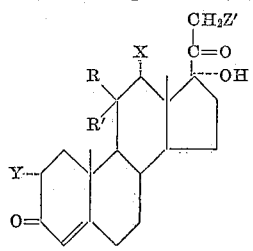

wherein R, R', X, and Y are as hereinbefore defined; and Z' is hydrogen or hydroxy with a mono or dihydric alcohol, such as a lower alkanol or a lower alkanediol, as exemplified by ethanol, propanol, ethylene glycol and propylene glycol, to yield the corresponding 3,20-bis-ketal derivatives of the formula

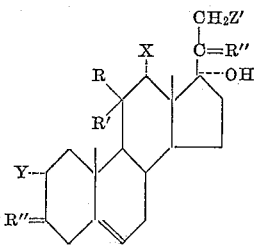

wherein R, R', X, Y, and Z' are as hereinbefore defined, and R'' —O-(lower alkylene)-O— or two lower alkoxy radicals. The ketalization reaction is preferably conducted in the presence of a strong acid such as p-toluenesulfonic acid.

The 3,20-bisketals thus formed are then reacted with a peracid, such as perbenzoic acid or peracetic acid, to yield the new 5α,6α-epoxy derivatives of this invention having the formula

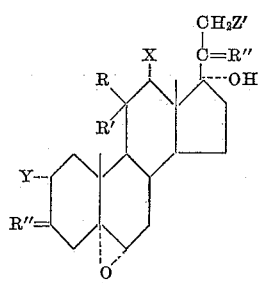

wherein R, R', R'', X, Y, and Z' are as hereinbefore defined.

The 5α,6α-epoxy derivatives are then treated with a hydrogen halide (i.e. hydrogen fluoride, hydrogen chloride, hydrogen bromide and hydrogen iodide) or boron trifluoride, to yield the corresponding new 6β-halo-5α-hydroxy derivatives of this invention having the formula

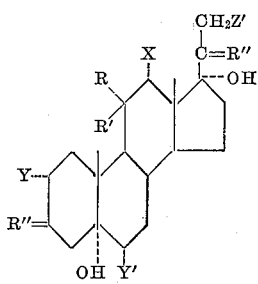

wherein R, R', R'', X, Y, Y', and Z' are as hereinbefore defined. The reaction is preferably conducted in an organic solvent for both the steroid and hydrogen halide or boron trifluoride reactant at any normal temperature such as ambient temperature.

If the reaction is carried out employing an aqueous solution of the hydrogen halide, that is a hydrohalic acid, the ketal groups are hydrolyzed to yield the 3,20-diketo-Δ⁴-pregnene derivatives, new compounds of the formula

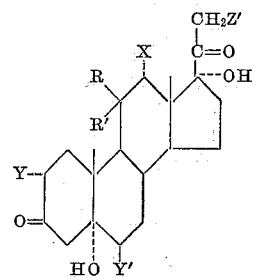

wherein R, R', X, Y, Y' and Z' are as hereinbefore defined.

The 5α-hydroxy-6β-halo derivatives are then treated with a strong acid, such as perchloric acid or hydrochloric acid, in glacial acetic acid, to dehydrate the steroid and to invert the 6β-halo group (with resulting hydrolysis of the ketal groups, if not previously accomplished), thereby yielding the desired 6α-halo-3,20-diketo-Δ⁴-pregnene derivatives of this invention having the formula

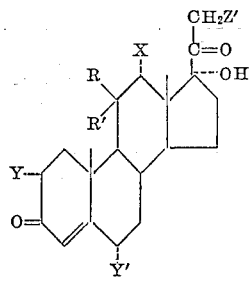

wherein R, R', X, Y, Y', and Z' are as hereinbefore defined.

If a Δ¹,⁴-pregnadiene is desired as the product, the Δ⁴-pregnene can then be subjected to microbial 1-dehydrogenation by using for example *Corynebacterium simplex* or *Nocardia aurantia* (as described in the application of Kroll et al., Serial No. 660,748, filed May 22, 1957, and now abandoned). As an alternative process, the steroids can be 1-dehydrogenated after 16-hydroxylation, as more fully described hereinafter. Furthermore, if a 21-ester is desired, the 21-hydroxy steroid formed can be esterified in the usual manner by treatment with an acyl halide or acid anhydride of a hydrocarbon carboxylic acid of less than ten carbon atoms as more fully described hereinafter.

The resulting 6α-halo steroids are then 16-hydroxylated by subjecting them to the oxygenating action of a microorganism such as *Streptomyces roseochromogenus* in accordance with the method described in the U.S. application of Josef Fried et al., Serial No. 739,943, filed June 4, 1958, now Patent No. 2,855,343, granted October 7, 1958 thereby yielding the intermediates of this invention having the general formula

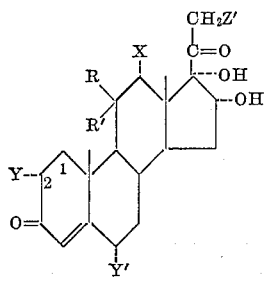

wherein the 1,2-position is saturated or double-bonded; and R, R', X, Y, Y' and Z' are as hereinbefore defined.

These intermediates are then reacted with an aldehyde or ketone of the formula:

wherein P and Q are as hereinbefore defined, and the resultant acetal or ketal derivative is recovered. The reaction is preferably carried out by treating a suspension or solution of the steroid in the aldehyde or ketone with or without an inert organic solvent (e.g. dioxane) with an acid catalyst (e.g. perchloric acid, p-toluenesulfonic acid and hydrochloric acid), neutralizing the acid and recovering the acetal or ketal derivative formed.

Among the suitable starting steroids utilizable in the process of this invention may be mentioned, 12α-halohydrocortisone (e.g. 12α-fluorohydrocortisone and 12α-chlorohydrocortisone), 12α-halocortisone (e.g. 12α-fluorocoritsone and 12α-chlorocortisone), 12α-halo-11β,17α-dihydroxyprogesterone (e.g. 12α-fluoro-11β,17α-dihydroxyprogesterone), 12α-halo-17α-hydroxy-11-ketoprogesterone (e.g. 12α-chloro-17α-hydroxy-11-ketoprogesterone), 2α-methyl-12α-halohydrocortisone (e.g. 2α-methyl-12α-fluorohydrocortisone), 2α-methyl-12α-halocortisone, 2α-methyl-11β,17α-dihydroxyprogesterone, and 2α-methyl-17α-hydroxy-11-ketoprogesterone.

Suitable aldehyde and ketone reactants include aldehydes such as paraldehyde, propanal, chloral hydrate, trifluoroacetaldehyde hemiacetal, heptafluorobutanal ethyl hemiacetal and hexanal; di(lower alkyl)ketones, such as acetone, diethylketone, dibutylketone, methylethylketone, and methylisobutylketone; halogenated di(lower alkyl) ketones, such as 1,1,1-trifluoro acetone; mono and dicycloalkyl ketones, such as cyclohexylmethyl ketone and dicyclopropyl ketone; cycloalkanones, such as cyclobutanone, cyclopentanone, cyclohexanone, suberone, and cyclodexanone; monocyclic aromatic aldehydes such as benzaldehyde, halobenzaldehydes (e.g. p-chlorobenzaldehyde and p-fluorobenzaldehyde), lower alkoxy benzaldehydes (e.g. o-anisaldehyde), di(lower alkoxy) benzaldehydes (e.g. veratraldehyde), hydroxybenzaldehydes (e.g. salicylaldehyde), dihydroxybenzaldehydes (e.g. resorcylaldehyde), lower alkyl benzaldehydes (e.g. m-tolualdehyde and p-ethylbenzaldehyde), di(lower alkyl) benzaldehydes (e.g. o,p-dimethylbenzaldehyde), nitrobenzaldehydes, acylamidobenzaldehydes (e.g. N-acetyl-anthranilaldehyde), and cyanobenzaldehydes; monocyclic aromatic lower alkanals, such as phenylacetaldehyde, α-phenylpropionaldehyde, β-phenylpropionaldehyde, γ-phenylbutyraldehyde, and aromatically-substituted halo, lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic aromatic lower alkyl ketones, such as acetophenone, propiophenone, butyrophenone, valerophenone, isocaprophenone, halophenyl lower alkyl ketones (e.g. p-chloroacetophenone and p-chloropropiophenone), (lower alkoxy)phenyl lower alkyl ketones (e.g. p-anisyl methyl ketone), di(lower alkoxy) phenyl lower alkyl ketones, hydroxyphenyl loweralkyl ketones, dihydroxyphenyl lower alkyl ketones (e.g. resacetophenone), (lower alkyl)phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetylanilines), and cyanophenyl lower alkyl ketones; benzophenone, and mono or bis substituted halo, lower alkoxy, hydroxy, lower alkyl, nitro, acylamido and cyano derivatives thereof; monocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoyl furan, and 2-acetylthiophene; monocyclic heterocyclic lower alkanones; and monocyclic heterocyclic ketones, such as alloxan.

If a 21-ester derivative is the desired product, the corresponding 21-hydroxy steroid can be acylated in the usual manner. Thus, to prepare the preferred 21-acyloxy derivatives wherein the acyl radical corresponds to the acyl radical of a hydrocarbon carboxylic acid of less than ten carbon atoms, either the acyl halide or acid anhydride of a lower alkanoic acid (e.g. acetic, propionic and tertbutyric acid), a monocyclic aryl carboxylic acid (e.g. benzoic and toluic acid), a monocyclic aryl lower alkanoic acid (e.g. phenacetic and β-phenylpropionic acid), a lower alkanoic acid, a cycloalkanecarboxylic acid, or a cycloalkenecarboxylic acid is employed as a reactant.

All of the compounds of this invention are physiologically-active substances which possess glucocorticoid and anti-inflammatory activity and hence can be used in lieu of known glucocorticoids such as hydrocortisone and cortisone in the treatment of rheumatoid arthritis, in the treatment of dermatoses, for which purpose they can be administered in the same manner as hydrocortisone, for example, the dosage being adjusted for the relative potency of the particular steroid.

The following examples are illustrative of the invention (all temperatures being in centigrade):

EXAMPLE 1

*16α,17α - Isopropylidene 6α - Fluoro - 12α - Chloro-16α-Hydroxy Cortisone*

(a) *Preparation of 12α-chlorocortisone-3,20-bis-ethylene ketal.*—A mixture of 200 mg. of 12α-chlorocortisone, 4 ml. of ethylene glycol, 18 ml. of benzene and 15 mg. of p-toluenesulfonic acid monohydrate is refluxed for 5 hours with the aid of a Dean-Stark water separator. After cooling of the reaction mixture, dilute sodium bicarbonate solution is added and the layers are separated. The aqueous phase is extracted with chloroform, the organic phases combined, washed with water, dried over sodium sulfate and evaporated to dryness in vacuo. The residue represents the 3,20-diethylene ketal of 12α-chlorocortisone and is used without further purification in step b.

(b) *Preparation of 5α,6α - oxido - 12α - chlorohydrocortisone-3,20-bis-ethylene ketal.*—To a solution of 1 gram of 12α-chlorocortisone-3,20-bis-ethylene ketal in 20 ml. of chloroform is added at 0° an ice-cold solution of 0.4 g. of perbenzoic acid in 10 ml. of chloroform. After 18 hours in the refrigerator the mixture is washed with dilute sodium bicarbonate solution and water, dried over sodium sulfate and the chloroform evaporated to dryness in vacuo. The residual 5α,6α-epoxide is recrystallized from acetone-hexane.

(c) *Preparation of 6β-fluoro-12α-chloropregnane-5α, 17α,21-triol-3,20-dione 3,20-bisethylene ketal.*—To a solution of 500 mg. of the 5α,6α-oxido ketal obtained in step b in 60 ml. of dry benzene and 15 ml. of absolute ether is added 1 ml. of freshly redistilled boron trifluoride etherate and the mixture allowed to stand at room temperature for three hours. After thorough washing with water the organic phase is dried over sodium sulfate and the solvents removed in vacuo. Recrystallization from acetone-hexane gives the pure fluorohydrin.

(d) *Preparation of 6α-fluoro-12α-chlorocortisone.*—To a solution of 500 mg. of the fluorohydrin obtained in step c in 25 ml. of glacial acetic acid is added 3 ml. of concentrated hydrochloric acid, and the resulting solution allowed to remain at room temperature overnight. The mixture is diluted with water and chloroform, the chloroform solution washed with water, dilute sodium bicarbonate and again with water, dried over sodium sulfate and the solvent removed in vacuo. The residual 6α-fluoro-12α-chlorocortisone is recrystallized from alcohol.

(e) *Preparation of 6α-fluoro-12α-chloro-16α-hydroxycortisone.*—Microbiological hydroxylation of 6α-fluoro-12α-chlorocortisone with *Streptomyces roseochromogenus* (Waksman No. 3689) as described in Serial No. 739,943, furnishes 6α-fluoro-12α-chloro-16α-hydroxycortisone.

(f) *Preparation of 16α,17α-isopropylidene 6α-fluoro-12α-chloro-16α-hydroxycortisone.*—To a suspension of 500 mg. of 6α-fluoro-12α-chloro-16α-hydroxycortisone in 75 ml. of acetone is added 0.05 ml. of 72% perchloric acid and the mixture agitated at room temperature for three hours. During this period the crystals gradually dissolve and the clear solution is neutralized with dilute bicarbonate and the acetone removed in vacuo. The resulting crystalline suspension is filtered and the crystals washed with water. The dried material is recrystallized from 95% alcohol to give the pure acetonide.

EXAMPLE 2

*16α,17α - Isopropylidene 6α,12α - Dichloro-16α-Hydroxycortisone*

Following the procedure of Example 1, but substituting 5 ml. of 0.5 N hydrogen chloride in 50 ml. of chloroform for the boron trifluoride etherate benzene and ether in step c, there is obtained 16α,17α-isopropylidene 6α,12α-dichloro-16α-hydroxycortisone.

EXAMPLE 3

*16α,17α-Isopropylidene 6α,12α-Difluoro-16α-Hydroxycortisone*

Following the procedure of Example 1, but substituting 200 mg. of 12α-fluorocortisone for the 12α-chlorocortisone in step a, there is obtained 16α,17α-isopropylidene 6α,12α-difluoro-16α-hydroxycortisone.

EXAMPLE 4

*16α,17α-Isopropylidene 6α-Fluoro-12α-Chloro-16α-Hydroxycortisone 21-Acetate*

A solution of 50 mg. of 6α-fluoro-12α-chloro-16α-hydroxycortisone 16α,17α-acetonide in 1 ml. of pyridine and 1 ml. of acetic anhydride is allowed to stand at room temperature for 18 hours. Removal of the reagents in vacuo gives a crystalline residue which after crystallization from acetone-hexane gives the pure acetate.

EXAMPLE 5

*16α,17α - (2' - Butylidene) 6α - Fluoro - 12α-Chloro-16α-Hydroxycortisone*

To a suspension of 100 mg. of 6α-fluoro-12α-chloro-16α-hydroxycortisone in 15 ml. of methylethylketone is added 0.05 ml. of 72% perchloric acid, and the mixture stirred at room temperature for two hours. The resulting solution is neutralized with sodium bicarbonated solution and after addition of water the methylethylketone is evaporated in vacuo. The resulting crystals are filtered, washed with water and dried in vacuo. Recrystallization from acetone-hexane gives the pure isobutylidene derivative.

EXAMPLE 6

*16α,17α - (4' - Methyl - 2' - Pentylidene) 6α-Fluoro-12α-Chloro 16α-Hydroxycortisone*

To a suspension of 100 mg. of 6α-fluoro-12α-chloro-16α-hydroxycortisone in 15 ml. of methylisobutylketone is added 0.05 ml. of 72% perchloric acid. The mixture is stirred at room temperature for 6 hours and the resulting solution extracted with dilute sodium bicarbonate solution, washed with water, the organic phase dried over sodum sulfate and the solvent evaporated in vacuo. Recrystallization of the resulting crystals from acetone-hexane gives the pure isohexylidene derivative.

EXAMPLE 7

*16α,17α - Cyclohexylidene 6α - Fluoro - 12α - Chloro-16α Hydroxycortisone*

A suspension of 200 mg. of 6α-fluoro-12α-chloro-16α-hydroxycortisone in 15 ml. of redistilled cyclohexanone is treated for two hours as described in Example 6.

EXAMPLE 8

*16α-17α(3'-Pentylidene) 6α-Fluoro-12α-Chloro-16α-Hydroxycortisone*

A suspension of 200 mg. of 6α-fluoro-12α-chloro-16α-hydroxycortisone in 30 ml. of diethylketone is treated for four hours as described in Example 6.

EXAMPLE 9

*16α,17α-Ethylidene 6α-Fluoro-12α-Chloro-16α-Hydroxycortisone*

To a suspension of 200 mg. 6α-fluoro-12α-chloro-16α-hydroxycortisone in 15 ml. of freshly distilled paraldehyde is added 0.05 ml. of 72% perchloric acid and the mixture agitated for 3.5 hours at room temperature. The resulting solution is extracted with dilute bicarbonate and water, dried, and the excess paraldehyde removed in vacuo. The residual material represents 16α,17α-ethylidene 6α-fluoro-12α-chloro-16α-hydroxycortisone.

EXAMPLE 10

*16α,17α-Isopropylidene 6α-Fluoro-12α-Chloro-16α-Hydroxyprednisone*

(a) *Preparation of 6α-fluoro-12α-chloro-16α-hydroxyprednisone.*—6α-fluoro-12α-chloro16α-hydroxycortisone is dehydrogenated in a concentration of 200 ug./ml. with *Nocardia aurantia* following the procedure in the application of Kroll et al., Serial No. 660,748, filed May 22, 1957, thereby yielding 6α-fluoro-12α-chloro-16α-hydroxyprednisone.

(b) *Preparation of 16α,17α-isopropylidene 6α-fluoro-12α-chloro-16α-hydroxyprednisone.*—Following the procedure of Example 1, step f, but substituting 500 mg. of 6α-fluoro-12α-chloro - 16α - hydroxyprednisone for the 6α-fluoro-12α-chloro-16α-hydroxycortisone, there is obtained 16α,17α-isopropylidene 6α-fluoro-12α-chloro-16α-hydroxyprednisone.

EXAMPLE 11

*16α,17α-Isopropylidene 6α-Fluoro-12α-Chloro-11β,16α,17α-Trihydroxyprogesterone*

Following the procedure of Example 1, but substituting 200 mg. of 12α-chloro-11β,17α-dihydroxyprogesterone for the 12α-chlorocortisone in step a, there is obtained 16α,17α-isopropylidene 6α-fluoro-12α-chloro-11β,16α,17α-trihydroxyprogesterone.

EXAMPLE 12

*16α,17α-Isopropylidene 6α,12α-Difluoro-16α,17α-Dihydroxy-11-Ketoprogesterone*

Following the procedure of Example 1, but substituting 200 mg. of 12α-fluoro-17α-hydroxy-11-ketoprogesterone for the 12α-chlorocortisone in step a, there is obtained 16α,17α-isopropylidene 6α,12α - difluoro - 16α,17α - dihydroxy-11-ketoprogesterone.

EXAMPLE 13

*16α,17α-Isopropylidene 6α,12α-Difluoro-16α-Hydroxyprednisolone*

(a) *Preparation of 5α,6α-oxido-12α-fluorohydrocortisone 3,20-bisethylene ketal.*—To a solution of 750 mg. of 12α-fluorohydrocortisone 3,20-bis-ethylene ketal (prepared by the method of Example 1, step a) in 50 ml. of chloroform is added at 0° 7.5 ml. of 0.28 N perbenzoic acid. After 18 hours at 4° the mixture is washed successively with sodium iodide, sodium bicarbonate, dilute sodium sulfite and water, the chloroform solution dried and the solvent removed in vacuo. The residual 5α,6α-epoxide is recrystallized from acetone-hexane.

(b) *Preparation of 6β,12α - difluoropregnane - 5α,11β,17α,21-tetrol-3,20-dione 3,20-bis-ethylene ketal.*—To a solution of 500 mg. of 5α,6α-epoxy-12α-fluorohydrocortisone 3,20-bisethylene ketal in 60 ml. of dry benzene and 15 ml. of absolute ether is added 1 ml. of freshly redistilled boron trifluoride etherate and the solution allowed to remain at room temperature for three hours. After thorough washing with water the organic phase is dried over sodium sulfate and the solvents removed in vacuo. Recrystallization from acetone-hexane gives the pure fluorohydrin.

(c) *Preparation of 6α,12α-difluoro-hydrocortisone.*—To a solution of 500 mg. of 6β,12α-difluoro-pregnane-5α-11β,17α,21-tetrol-3,20-dione 3,20-bis-ethylene ketal in 25 ml. of glacial acetic acid is added 3 ml. of concentrated hydrochloric acid, and the resulting solution allowed to remain at room temperature for 18 hours. The mixture is diluted with water and chloroform, the chloroform solution washed with water, dilute sodium bicarbonate and again with water, dried over sodium sulfate and the solvent evaporated in vacuo. The resulting 6α,12α-difluoro-hydrocortisone is recrystallized from acetone-hexane.

(d) *Preparation of 6α,12α-difluoro-16α-hydroxyhydrocortisone.*—6α,12α-difluoro-hydrocortisone is fermented with *Streptomyces roseochromogenus* (Waksman No. 3689) following the procedure in Serial No. 739,943. The resultant 6α,12α-difluoro-16α-hydroxyhydrocortisone is extracted from the filtered broth with methylisobutyl ketone and recovered from the latter solvent by concentration and filtration of the resulting crystalline material.

(e) *Preparation of 6α-12α-difluoro-16α-hydroxyprednisolone.*—6α,12α-difluoro-16α-hydroxyhydrocortisone is dehydrogenated in a concentration of 200 ug./ml. with *Nocardia aurantia* following the procedure in the application Serial No. 660,748, thereby yielding 6α,12α-difluoro-16α-hydroxyprednisolone.

(f) *Preparation of 16α,17α-isopropylidene 6α,12α-difluoro-16α-hydroxyprednisolone.*—Following the procedure of Example 1, step f, but substituting 500 mg. of 6α,12α-difluoro-16α-hydroxyprednisolone for the steroid in the example, there is obtained 16α,17α-isopropylidene 6α,12α-difluoro-16α-hydroxyprednisolone.

EXAMPLE 14

*16α,17α-Isopropylidene 6α,12α-Difluoro-2α-Methyl-16α-Hydroxyhydrocortisone*

(a) *Preparation of 12α-fluoro-2α-methylhydrocortisone 3,20-bis-ethylene ketal.*—A mixture of 2 g. of 12α-fluoro-2α-methylhydrocortisone, 40 mg. of p-toluenesulfonic acid, 32 ml. of ethylene glycol and 60 ml. of benzene is heated at reflux with a Dean-Stark separator for six hours. After cooling, the mixture is neutralized with dilute sodium bicarbonate, the layers separated and the aqueous phase extracted with chloroform. The combined benzene and chloroform phases are washed with water, dried over sodium sulfate and the solvents evaporated in vacuo. The residual diketal is recrystallized from acetone.

(b) *Preparation of 16α,17α-isopropylidene 6α,12α-difluoro-2α-methyl - 16α - hydroxyhydrocortisone.*—Following the procedures in steps a, b, c, d, and f of Example 13, but substituting 800 mg. of 12α-fluoro-2α-methylhydrocortisone 3,20-bis-ethylene ketal for the 12α-fluorohydrocortisone 3,20-bis-ethylene ketal in step a, there is obtained 16α,17α-isopropylidene 6α,12α-difluoro-2α-methyl-16α-hydroxyhydrocortisone.

EXAMPLE 15

*16α,17α-Isopropylidene 6α,12α-Difluoro-$\Delta^{1,4}$-Pregnadiene-16α,17α-diol-3,11,20-Trione*

Following the procedures in step e and f of Example 13, but substituting 6α,12α-difluoro-16α,17α-dihydroxyprogesterone for the 6α,12α-difluoro-16α-hydroxyhydrocortisone in step e, there is obtained 6α,17α-isopropylidene 6α,12α - difluoro - $\Delta^{1,4}$-pregnadiene-16α,17α-diol-3,11,20-trione.

EXAMPLE 16

*16α,17α-Isopropylidene 6α,12α-Difluoro-$\Delta^{1,4}$-Pregnadiene-11β,16α,17α-Triol-3,20-Dione*

(a) *Preparation of 6α,12α-difluoro-16α-hydroxyprednisolone acetonide 12-mesylate.*—To a solution of 1.5 g. of 6α,12α-difluoro-16α-hydroxyprednisolone acetonide in 15 ml. of anhydrous pyridine is added at 0° 1.5 ml. of methanesulfonyl chloride. After 2.5 hours in the refrigerator ice water is added and the resulting precipitate filtered off and washed thoroughly with water. The material is dried and used without further purification in the reduction step.

(b) *Preparation of 16α,17α-isopropylidene 6α,12α-difluoro - $\Delta^{1,4}$ - pregnadiene - 11β,16α,17α - triol - 3,20-dione.*—A solution of 500 mg. of the above mesylate and 1.5 gm. sodium iodide in 50 ml. of glacial acetic acid is refluxed for 4 hours. The solution is concentrated in vacuo, water is added and the steroids extracted with chloroform. The chloroform extract is washed with sodium bicarbonate solution and water, dried over sodium sulfate and the solvent evaporated to dryness in vacuo. The residual acetonide is recrystallized from acetone-hexane.

Replacing the steroid reactant in Example 16 by 6α,12α-difluoro - $\Delta^4$ - pregnene - 11β,16α,17α,21 - tetrol - 3,20-dione acetonide there is obtained the corresponding $\Delta^4$-pregnene derivative.

EXAMPLE 17

*16α,17α-Chloral Derivative of 6α-Fluoro-12α-Chloro-16α-Hydroxycortisone*

A suspension of 500 mg. of 6α-fluoro-12α-chloro-16α-hydroxycortisone and 4 gm. of chloral hydrate in 20 ml. of dioxane is agitated at room temperature for 24 hours. The mixture is filtered, neutralized with aqueous sodium bicarbonate and extracted with chloroform. The chloroform-dioxane phase is dried over sodium sulfate, the solvent removed in vacuo and the residual chloral derivative crystallized from methanol.

EXAMPLE 18

*16α,17α-(1,1,1-Trifluoroisopropylidene) 6α-Fluoro-12α-Chloro-16α-Hydroxycortisone*

Following the procedure of Example 17 but replacing the chloral hydrate used in that example by a mixture of 5 ml. of dioxane and 5 ml. of 1,1,1-trifluoroacetone there is obtained the trifluoroisopropylidene derivative.

EXAMPLE 19

*Acetophenone Derivative of 6α-Fluoro-12α-Chloro-16α-Hydroxycortisone*

To a suspension of 4 g. of 6α-fluoro-12α-chloro-16α-hydroxycortisone in 100 ml. of freshly redistilled acetophenone is added 1.0 ml. of 72% perchloric acid and the mixture stirred at room temperature for two hours, during which period all the 6α-fluoro-12α-chloro-16α-hydroxycortisone has dissolved. The solution is neutralized by the addition of 8 ml. of 1.1 N NaOH and of sufficient aqueous bicarbonate to render it neutral. Water and chloroform is then added and the chloroform-acetophenone layer concentrated in high vacuum. The residue is recrystallized from acetone-hexane and the crystals washed well with hexane to remove adhering acetophenone.

EXAMPLE 20

*Acetophenone Derivative of 6α-Fluoro-12α-Chloro-16α-Hydroxycortisone 21-Acetate*

A solution of 50 mg. of the acetophenone derivative of 6α-fluoro-12α-chloro-16α-hydroxycortisone in 1 ml. of pyridine and 1 ml. of acetic anhydride is allowed to stand at room temperature for 18 hours. Removal of the reagents in vacuo gives a crystalline residue which after crystallization from acetone-hexane gives the pure acetate.

Substitution of 6α,12α-difluoro-Δ$^{1,4}$-pregnadiene-16α,17α,21-triol-3,11,20-trione for the steroid in the procedures of Examples 19 and 20, yield the corresponding Δ$^{1,4}$-pregnadiene derivative.

EXAMPLE 21

*Acetophenone Derivative of 6α,12α-Difluoro-Δ⁴-Pregnene-11β,16α,17α,21-Tetrol-3,20-Dione*

A suspension of 200 mg. of 6α,12α-difluoro-Δ⁴-pregnene-11β,16α,17α,21-tetrol-3,20-dione in 30 ml. of acetophenone is stirred at room temperature with 100 mg. of p-toluenesulfonic acid monohydrate for 18 hours. The clear solution is neutralized with sodium bicarbonate solution and the acetone evaporated in vacuo. The resulting crystals are filtered and dried in vacuo. Recrystallization from acetone-hexane gives the pure acetophenone derivative.

Reaction of 6α,12α-difluoro-Δ$^{1,4}$-pregnadiene-11β,16α,17α,21-tetrol-3,20-dione with acetophenone gives the corresponding Δ$^{1,4}$-pregnadiene derivative.

EXAMPLE 22

*Benzaldehyde Derivative of 6α,12α-Difluoro-16α-Hydroxyhydrocortisone*

To a suspension of 100 mg. of 6α,12α-difluoro-16α-hydroxyhydrocortisone in 15 ml. of benzaldehyde is added 0.05 ml. of 72% perchloric acid. The mixture is treated as in Example 19 and results in the formation of the benzaldehyde derivative of 6α,12α-difluoro-16α-hydroxyhydrocortisone.

If 6α,12α-difluoro-16α-hydroxycortisone is substituted for the 6α,12α-difluoro-16α-hydroxyhydrocortisone in the procedure of Example 22 the benzaldehyde derivative of 6α,12α-difluoro-16α-hydroxycortisone is obtained.

EXAMPLE 23

*Furfural Derivative of 6α,12α-Difluoro-16α-Hydroxyprednisolone*

Treatment of 6α,12α-difluoro-16α-hydroxyprednisolone with furfural in the presence of perchloric acid according to the procedure of Example 19 results in the formation of the furfural derivative of 6α,12α-difluoro-16α-hydroxyprednisolone.

EXAMPLE 24

*16α,17α-Alloxan Derivative of 6α-Fluoro-12α-Chloro-16α-Hydrocortisone*

A suspension of 0.5 gm. 6α-fluoro-12α-chloro-16α-hydroxyhydrocortisone and 2.5 gm. of alloxan in 20 ml. of dioxane and 0.15 ml. of 72% perchloric acid is agitated at room temperature for 24 hours. The mixture is neutralized with aqueous sodium bicarbonate solution and after the addition of 20 ml. of water extracted with chloroform. The chloroform extract is dried over sodium sulfate and evaporated to dryness in vacuo. The residual alloxan derivative is recrystallized from 95% alcohol.

EXAMPLE 25

*Dicyclopropyl Ketone Derivative of 6α-Fluoro-12α-Chloro-16α-Hydroxycortisone*

Following the procedure of Example 18, but replacing the trifluoroacetone by dicyclopropyl ketone, there is obtained the dicyclopropyl derivative of 6α-fluoro-12α-chloro-16α-hydroxycortisone.

The steroids of this invention can also be prepared by an alternative method of this invention which comprises the interaction of a steroid of the general formula

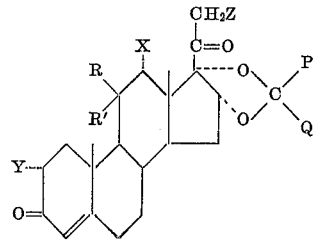

wherein R, R', X, Y, Z, P and Q are as hereinbefore defined, with a mono or dihydric alcohol, such as a lower alkanol or a lower alkanediol, such as ethanol, propanol, ethylene glycol or propylene glycol, to yield the corresponding 3-mono-ketal derivatives of the formula

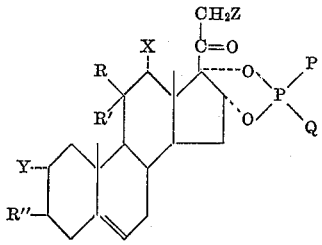

wherein, R, R', X, Y, Z, P and Q are as hereinbefore defined, and R'' is —O-(lower alkylene)-O— or two lower alkoxy radicals. The ketalization reaction is preferably conducted in the presence of a strong acid such as p-toluenesulfonic acid.

The 3-monoketals thus formed are then reacted with a peracid, such as perbenzoic acid or peracetic acid, to yield the new 5α,6α-epoxy derivatives of this invention having the formula

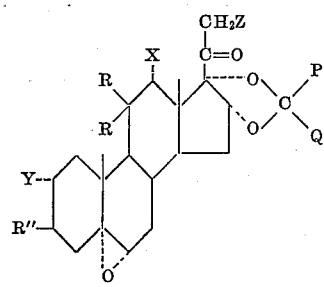

wherein R, R', R", X, Y, Z, P and Q are as hereinbefore defined.

The 5α,6α-epoxy derivatives are then treated with a hydrogen halide (i.e. hydrogen fluoride, hydrogen chloride, hydrogen bromide and hydrogen iodide) or boron trifluoride, to yield the corresponding new 6β-halo-5α-hydroxy derivatives of this invention. The reaction is preferably conducted in the cold (i.e. below or at room temperature) in an organic solvent for both the steroid and hydrogen halide reactant. If the reaction is carried out employing an aqueous solution of the hydrogen halide, that is a hydrohalic acid, the 3-ketal group is hydrolyzed yielding the 3-keto-Δ⁴-pregnene derivative.

The 5α-hydroxy-6β-halo derivatives are then treated with a strong acid, such as perchloric acid or hydrocloric acid, in glacial acetic acid, to dehydrate the steroid and to invert the 6β-halo group (with resulting hydrolysis of the 3-ketal group, if not previously accomplished), thereby yielding the desired 6α-halo-3-keto-Δ⁴-pregnene derivatives.

If a Δ¹,⁴-pregnadiene is desired as the product, the Δ⁴-pregnene can then be subjected to microbial 1-dehydrogenation by using for example, *Nocardia aurantia*, as described in the application of Kroll et al., Serial No. 660,748, issued May 22, 1957. Furthermore, if a 21-ester is desired and a free 21-hydroxy steriod is used as the reactant, the 21-hydroxy steroid formed can be esterified in the usual manner by treatment with an acyl halide or acid anhydride of a hydrocarbon carboxylic acid of less than ten carbon atoms as described hereinbefore.

The series of steps in the process of this invention can be represented by the following equations:

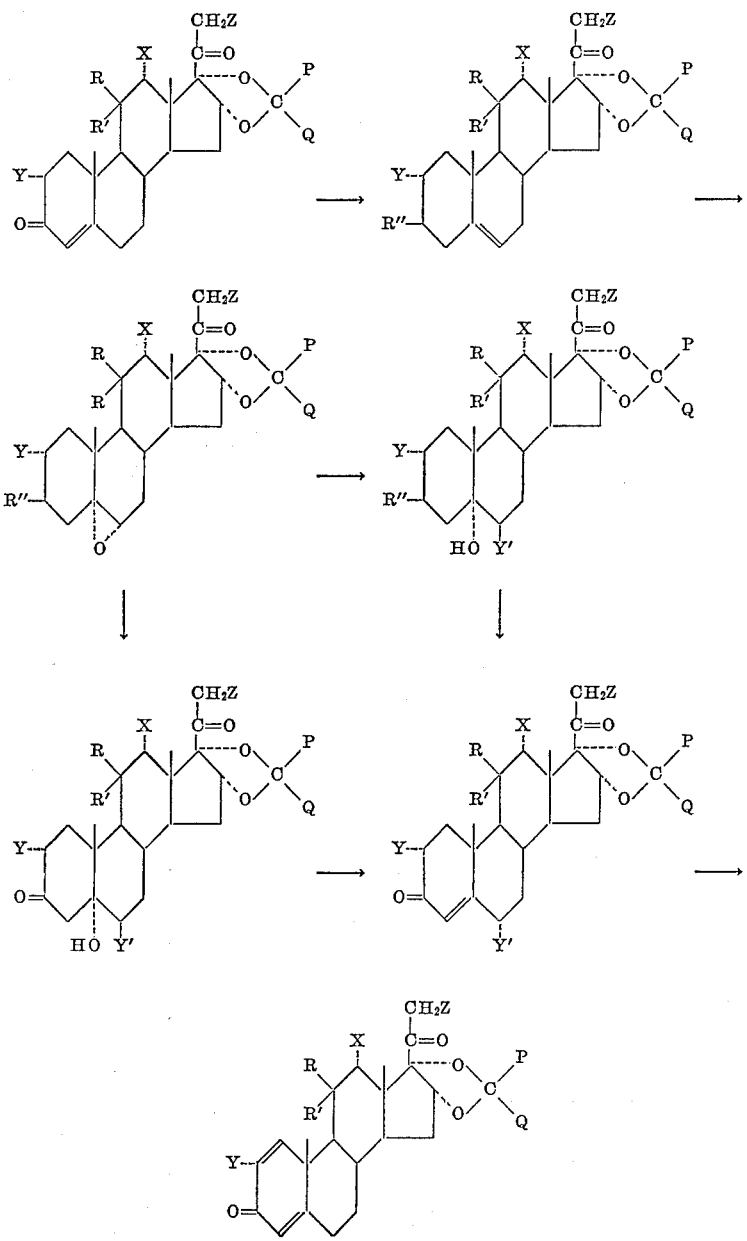

The following examples illustrates the alternative process of this invention (all temperatures being in centigrade):

EXAMPLE 26

*12α-Fluoro-16α-Hydroxyhydrocortisone Acetonide 3-Ethylene Ketal*

A mixture of 2 grams of 12α-fluoro-16α-hydroxyhydrocortisone acetonide, 40 mg. of p-toluenesulfonic acid, 16 ml. of ethylene glycol and 60 ml. of benzene is heated at reflux with a Dean-Stark separator for 6 hours. After cooling, the mixture is neutralized with dilute sodium bicarbonate, the layers are separated and the aqueous phase extracted with chloroform. The combined benzene and chloroform phases are washed with water, dried over sodium sulfate and the solvents evaporated in vacuo. The residual ketal is recrystallized from acetone.

EXAMPLE 27

*5α,6α-Oxido-12α-Fluoro-16α-Hydroxyhydrocortisone Acetonide 3-Ethylene Ketal*

To a solution of 1 gm. of 12α-fluoro-16α-hydroxyhydrocortisone acetonide 3-ethylene ketal in 20 ml. of chloroform is added an ice-cold solution of 0.4 gm. of perbenzoic acid in 10 ml. of chloroform. After 18 hours at 4° the mixture is washed with dilute sodium bicarbonate and water, dried over sodium sulfate and the solvent evaporated in vacuo. The residual epoxide is crystallized from acetone-hexane.

EXAMPLE 28

*6β-Chloro-12α-Fluoropregnane-5α,11β,16α,17α,21-Pentol-3,20-Dione Acetonide 3-Ethylene Ketal*

To a solution of 500 mg. of 5α,6α-oxido-12α-fluoro-16α-hydroxyhydrocortisone acetonide 3-ethylene ketal in 50 ml. of ice-cold chloroform is added 7 ml. of an ice-cold 0.5 N solution of hydrogen chloride in chloroform. The mixture is allowed to remain at 0° for two hours, after which it is washed with dilute sodium bicarbonate solution and water. The chloroform solution is dried over sodium sulfate and the solvent evaporated in vacuo. The residual chlorohydrin is used in Example 29 without further purification.

EXAMPLE 29

*6α-Chloro-12α-Fluoro-16α-Hydroxyhydrocortisone Acetonide*

To a solution of 500 mg. of the chlorohydrin obtained in Example 28 in 25 ml. of glacial acetic acid is added 3 ml. of concentrated hydrochloric acid, and the resulting solution allowed to remain at room temperature for 18 hours. The mixture is diluted with water and chloroform, the chloroform solution washed with water, dilute sodium bicarbonate and again with water, dried over sodium sulfate and the solvent evaporated in vacuo. The resulting 6α-chloro-12α-fluoro-16α-hydroxyhydrocortisone acetonide is recrystallized from acetone-hexane.

EXAMPLE 30

*6α-Chloro-12α-Fluoro-16α-hydroxyprednisolone Acetonide*

6α-chloro-12α-fluoro-16α-hydroxyhydrocortisone acetonide is dehydrogenated in a concentration of 200 ug./ml. with *Nocardia aurantia*, following the procedure in Serial No. 660,748.

Instead of the anhydrous hydrogen chloride used in Example 28 in the opening of the 5α,6α-epoxide, aqueous hydrochloric acid can be used as follows. In this case the 3-ethylene ketal is hydrolyzed.

EXAMPLE 31

*6β-Chloro-12α-Fluoropregnane-5α,11β,16α,17α,21-Pentol-3,20-Dione Acetonide*

To a solution of 500 mg. of 5α,6α-oxido-12α-fluoro-16α-hydroxyhydrocortisone acetonide 3-ethylene ketal in 20 ml. of dioxane is added 2 ml. of concentrated hydrochloric acid and the mixture allowed to stand at room temperature for two hours. Chloroform is then added and the mixture extracted with water, dilute sodium bicarbonate and again with water. The chloroform-dioxane phase is dried over sodium sulfate and the solvents removed in vacuo. The residual chlorohydrin is recrystallized from acetone-hexane.

Replacing the hydrochloric acid in Examples 28 and 31 by hydrobromic or hydroiodic acid results in the formation of the corresponding 6β-bromo and 6β-iodo-derivatives, which can be converted to 6α-bromo-12α-fluoro-16α-hydroxyhydrocortisone acetonide and 6α-iodo-12α-fluoro-16α-hydroxyhydrocortisone acetonide, respectively, by the process of Example 29.

EXAMPLE 32

*6β,12α-Difluoro-Pregnane-5α,11β,16α,17α,21-Pentol-3,20-Dione Acetonide*

To a solution of 500 mg. of 5α,6α-oxido-12α-fluoro-16α-hydroxyhydrocortisone acetonide 3-ethylene ketal in 25 ml. of chloroform is added 5 ml. of 48% aqueous hydrofluoric acid and the mixture agitated at room temperature for one hour. Water and chloroform is added and the mixture neutralized with sodium bicarbonate. The chloroform layer is dried over sodium sulfate and the solvent removed in vacuo. The residual 6β-fluorohydrin is recrystallized from acetone-hexane.

The 6β-fluorohydrin is converted into 6α,12α-difluoro-16α-hydroxyhydrocortisone acetonide as described in Example 29 for the 6β-chloro-3-ethylene ketal. Moreover it can be dehydrogenated with *N. aurantia* as described in Example 30 for the corresponding 6α-chloro compound.

EXAMPLE 33

*6β,12α-Difluoro-Pregnane-5α,11β,16α,17α,21-Pentol-3,20-Dione Acetonide 3-Ethylene Ketal*

To a solution of 500 mg. of 5α,6α-oxido-12α-fluoro-16α-hydroxyhydrocortisone acetonide 3-ethylene ketal in 60 ml. of dry benzene and 15 ml. of absolute ether is added 1 ml. of freshly redistilled boron trifluoride etherate and the solution allowed to remain at room temperature for three hours. After thorough washing with water the organic phase is dried over sodium sulfate and the solvents removed in vacuo. Recrystallization from acetone-hexane gives the pure 6β-fluorohydrin.

The processes of Examples 26 and 33 are of general applicability and may be used to convert any of the 12α-halo-Δ⁴-pregnene products disclosed in my applications, Serial Nos. 677,295 and 714,047, filed August 9, 1957 and February 10, 1958, respectively, the latter now abandoned, to their corresponding 5α,6α-oxido derivatives, and thence to the corresponding 6β-halo-5α-hydroxy derivatives, from which the desired 6α-halo-Δ⁴-pregnanes are prepared.

The invention may be variously otherwise embodied within the scope of the appended claims.

What is claimed is:

1. A compound selected from the group consisting of steroids of the general formulae

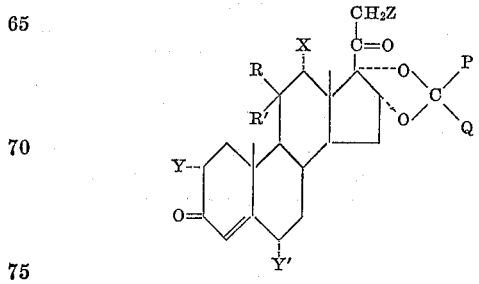

and

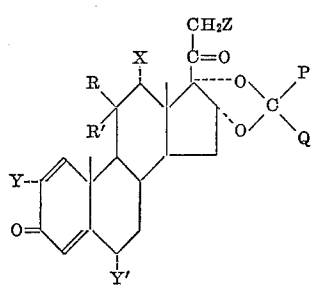

wherein R is hydrogen, R' is β-hydroxy and together R and R' is keto; X is halogen; Y is selected from the group consisting of hydrogen and methyl; Y' is halogen; Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic.

2. 16α,17α-lower alkylidene 6α,12α-dihalo-16α-hydroxy-hydrocortisone.

3. 16α,17α-lower alkylidene 6α,12α-dihalo-16α-hydroxy-prednisolone.

4. 16α,17α-lower haloalkylidene 6α,12α-dihalo-16α-hydroxyprednisolone, wherein the haloalkylidene radical contains at least two carbon atoms.

5. 16α,17α-lower alkylidene 6α,12α-dihalo-16α-hydroxyprednisone.

6. 16α,17α-lower alkylidene 6α,12α-dihalo-16α-hydroxycortisone.

7. A steroid of the general formula

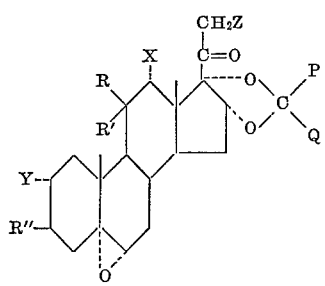

wherein R is hydrogen, R' is β-hydroxy and together R and R' is keto; X is halogen; Y is selected from the group consisting of hydrogen and methyl; R'' is selected from the group consisting of —O-(lower alkylene)-O— and two lower alkoxy radicals; Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic.

8. A process for preparing a steroid of claim 7 which comprises interacting a steroid of the general formula

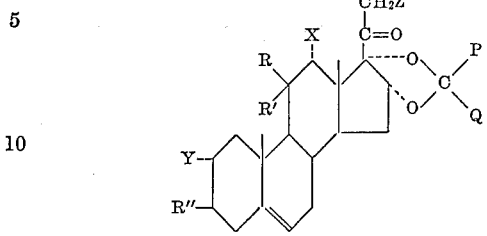

wherein R, R', X, Y, R'', Z, P and Q are as defined in claim 7 with a peracid and recovering the resulting 5α,6α-oxido steroid formed.

9. A steroid of the general formula

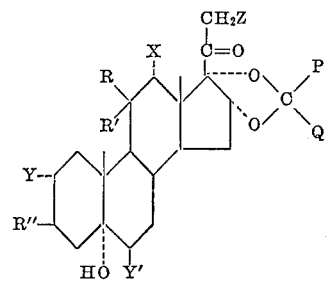

wherein Y' is halogen, R is hydrogen, R' is β-hydroxy and together R and R' is keto; X is halogen; Y is selected from the group consisting of hydrogen and methyl; R'' is selected from the group consisting of —O-(lower alkylene)-O— and two lower alkoxy radicals; Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic.

10. A steroid of the general formula

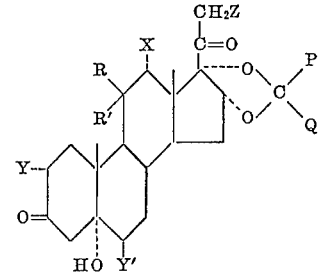

wherein R is hydrogen, R' is β-hydroxy and together R and R' is keto; X is halogen; Y is selected from the group consisting of hydrogen and methyl; Y' is halogen, Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic, and monocyclic heterocyclic lower alkyl; and together with the carbon atom to which they are joined P and Q is selected from the group consisting of cycloalkyl and monocyclic heterocyclic.

11. A compound selected from the group consisting of steroids of the general formulae

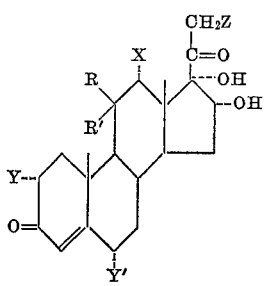

and

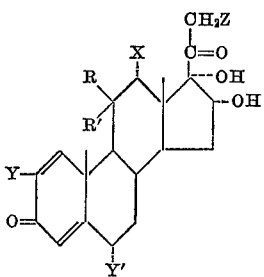

wherein R is hydrogen, R' is β-hydroxy and together R and R' is keto; X is halogen; Y is selected from the group consisting of hydrogen and methyl; Y' is halogen; and Z is selected from the group consisting of hydrogen, hydroxy and the acyloxy radical of a hydrocarbon carboxylic acid of less than ten carbon atoms.

12. A process for preparing a steroid of the general formula

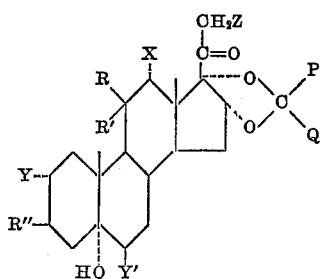

wherein Y' is halogen, R is hydrogen, R' is β-hydroxy and together R and R' is keto, X is halogen; Y is selected from the group consisting of hydrogen and methyl; R'' is selected from the group consisting of —O—(lower alkylene)-O— and two lower alkoxy radicals; Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic and monocyclic heterocyclic lower alkyl; and together with the carbon atom to which they are joined P and Q is selected from the group consisting of cycloalkyl and monocyclic heterocyclic; which comprises interacting a corresponding steroid of the general formula

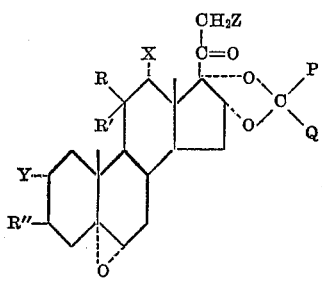

wherein R, R', X, Y, R'', Z, P and Q are as above defined, with a compound selected from the group consisting of hydrogen halide and boron trifluoride under substantially anhydrous conditions, and recovering the 6β-halo-5α-hydroxy steroid formed.

13. A process for preparing a steroid of the general formula

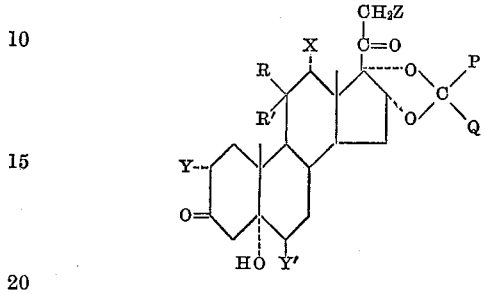

wherein R is hydrogen; R' is β-hydroxy and together R and R' is keto; X is halogen; Y is selected from the group consisting of hydrogen and methyl; Y' is halogen; Z is selected from the group consisting of hydrogen, hydroxy and the acyloxy radical of a hydrocarbon carboxylic acid of less than ten carbon atoms; P and Q are selected from the group consisting of hydrogen, lower alkyl, halogenated lower alkyl, monocyclic cycloalkyl, monocyclic aryl, monocyclic aryl lower alkyl, monocyclic heterocyclic and monocyclic heterocyclic lower alkyl; and together with the carbon to which they are joined P and Q is selected from the group consisting of cycloalkyl and monocyclic heterocyclic; which comprises interacting a corresponding steroid of the general formula

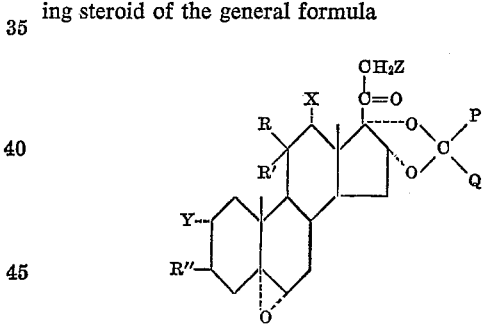

wherein R, R', X, Y, Z, P and Q are as hereinbefore defined, and R'' is selected from the group consisting of —O-(lower alkylene)-O— and two lower alkoxy radicals, with a hydrohalic acid under aqueous conditions and recovering the 6β-halo-5α-hydroxy steroid formed.

14. 16α,17α - isopropylidene 6α,12α - difluoro-16α-hydroxyprednisolone.

15. 6α,12α-difluoro-16α-hydroxyhydrocortisone 16,17-acetophenonide.

16. 6α,12α-difluoro-16α-hydroxyhydrocortisone.

17. 6α,12α-difluoro-16α-hydroxyprednisolone.

References Cited in the file of this patent

UNITED STATES PATENTS

| | | |
|---|---|---|
| 2,584,271 | Huffman | Feb. 5, 1952 |
| 2,736,732 | Knowles | Feb. 28, 1956 |
| 2,831,003 | Thomas | Apr. 15, 1958 |
| 2,838,496 | Babcock et al. | June 10, 1958 |
| 2,838,540 | Campbell et al. | June 10, 1958 |
| 2,838,542 | Spero et al. | June 10, 1958 |

OTHER REFERENCES

Cooley et al.: J. Chem. Soc. (London), December 1955, pp. 4373–4377.

Ellis et al.: J. Chem. Soc. (London), December 1955, pp. 4383–4388.